United States Patent [19]

Smith

[11] Patent Number: 4,687,382

[45] Date of Patent: * Aug. 18, 1987

[54] SYSTEM FOR CONTROLLING SOLID TRANSPORT

[75] Inventor: David S. Smith, San Rafael, Calif.

[73] Assignee: Chevron Research Corporation, San Francisco, Calif.

[*] Notice: The portion of the term of this patent subsequent to Aug. 11, 2004 has been disclaimed.

[21] Appl. No.: 904,131

[22] Filed: Sep. 5, 1986

Related U.S. Application Data

[62] Division of Ser. No. 677,640, Dec. 4, 1984, abandoned.

[51] Int. Cl.$^4$ ............................................. B65G 53/30
[52] U.S. Cl. .................................... 406/168; 406/108; 406/127; 406/192
[58] Field of Search ............... 406/108, 122, 127, 133, 406/109, 106, 168, 169, 23, 192; 414/217; 222/637, 547, 564

[56] References Cited

U.S. PATENT DOCUMENTS

| | | | |
|---|---|---|---|
| 692,106 | 1/1902 | Bedarrides | 406/168 |
| 2,609,249 | 9/1952 | Winter, Sr. | 406/108 X |
| 2,723,883 | 11/1955 | Lapple | 222/637 X |
| 3,316,027 | 4/1967 | Lloyd | 406/122 |
| 3,776,600 | 12/1973 | McLeod, Jr. | 406/168 |

Primary Examiner—Jeffrey V. Nase
Attorney, Agent, or Firm—S. R. LaPaglia; T. G. DeJonghe; V. J. Cavalieri

[57] ABSTRACT

Methods and apparatus for controlling the flow of solids in systems containing solid/fluid slurries is disclosed. An L-valve, having subsequent thereto a separator for separating the solid and fluid phases of the slurry, and a way to regulate the flow of the separated fluid permits the opening and closing of the L-valve without the necessity of mechanical valving systems in contact with the solid phase. A novel L-valve design comprising a radial barrier above a vertical outlet which barrier is of sufficient dimension to permit the solids to attain their angle of repose before reaching the outlet is also disclosed.

7 Claims, 8 Drawing Figures

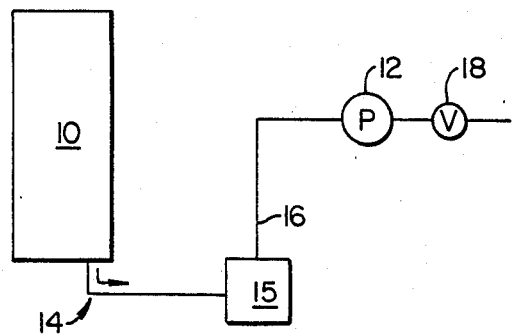
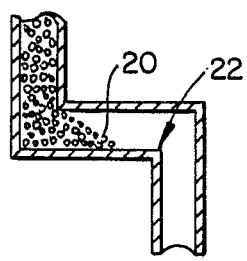
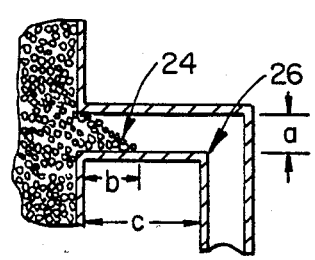
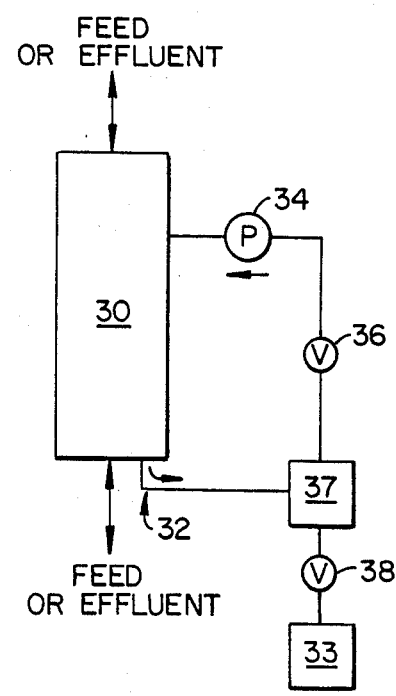
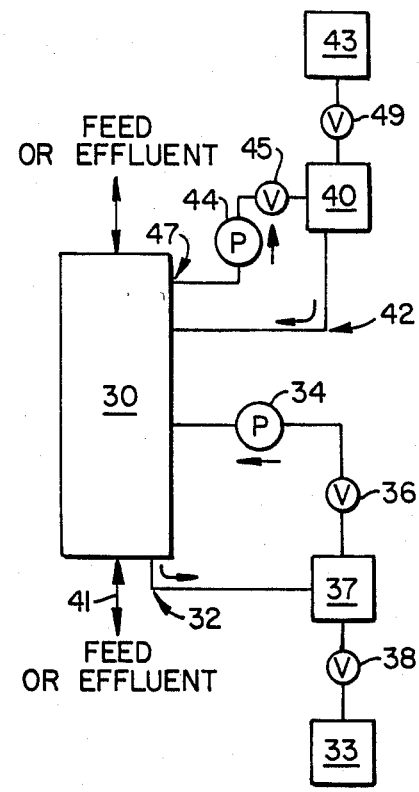
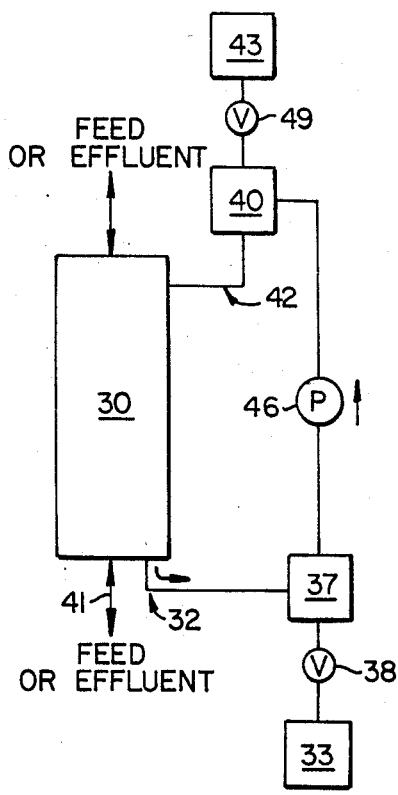
FIG. 1.
FIG. 2A.
FIG. 2B.
FIG. 3.
FIG. 4A.
FIG. 4B.

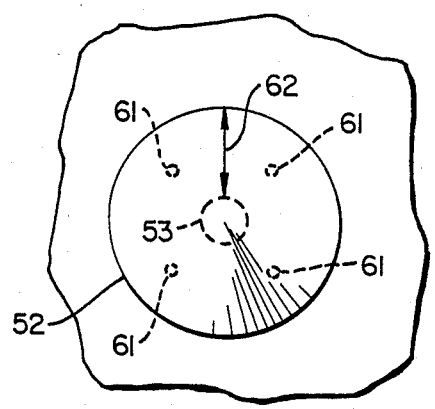
FIG._6.
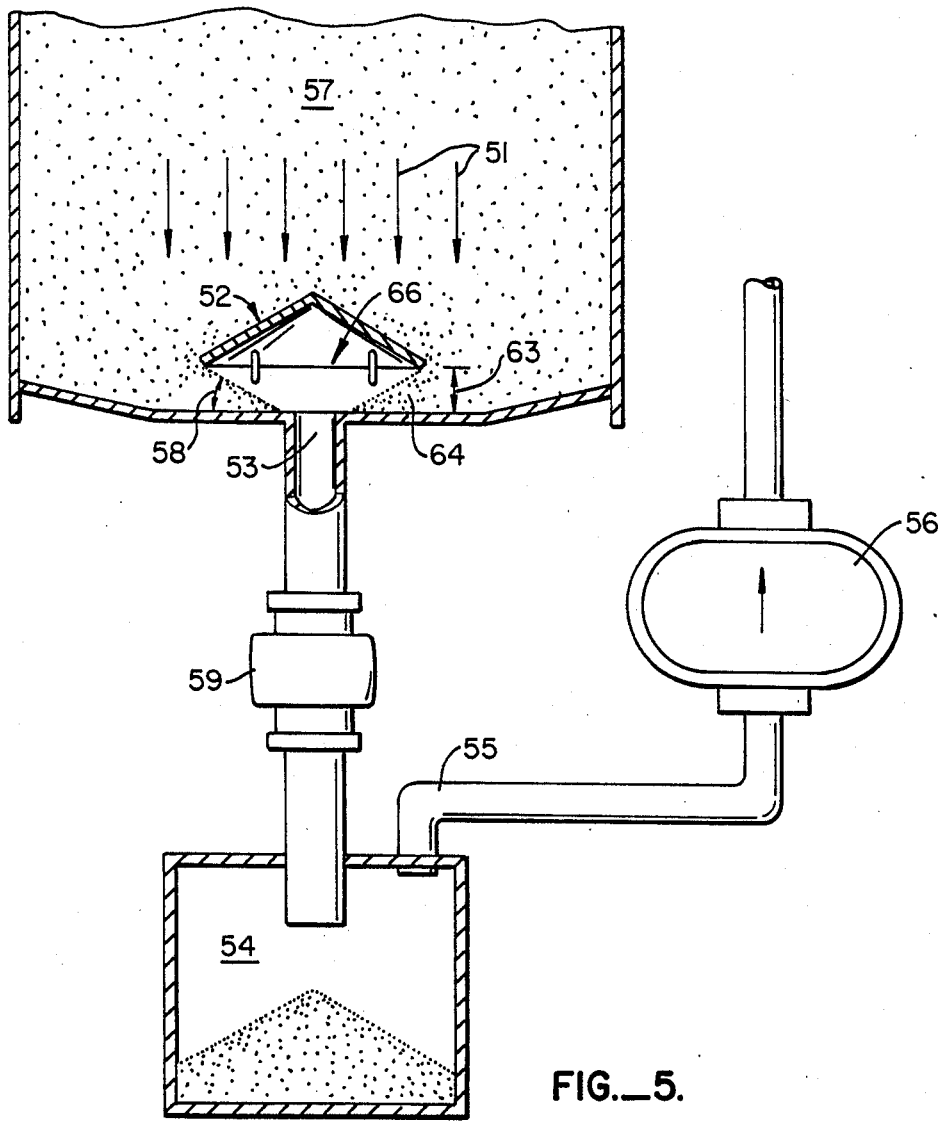
FIG._5.

SYSTEM FOR CONTROLLING SOLID TRANSPORT

This is a division of application Ser. No. 677,640, filed Dec. 4, 1984, abandoned.

BACKGROUND

This invention relates to the field of controlling the flow of solids in liquid or other fluid suspensions. More particularly, the invention relates to a system for stopping and starting the flow of suspended solids using mechanical valves which are not in communication with the solids in the suspension when they are opened and closed.

Circulation of solid/fluid slurries through conduits or vessels, or both, presents some problems in control of flow which are not present in purely fluid systems. A number of valve designs are available for permitting and preventing the flow of liquids or gases which are capable of functioning over long periods of time with some efficiency. However, the presence of suspended solid particles renders the use of mechanical valve systems at least troublesome because the solids represent a source of abrasion and wear to these mechanical systems.

The necessity for circulating or transferring slurries and for controlling this circulation and the transfer of the solid particles arises in a number of contexts, such as waste water treatment, ion exchange resin beds and manufacturing processes involving supported immobilized enzymes. A particularly important application is the necessity for catalyst replacement in petroleum refining, reforming, and hydroprocessing. Because the reactions such catalysts control generate deposits which progressively inactivate the catalyst, the catalyst needs periodically to be replaced.

Multitudinous approaches to the resolution of this latter problem have been disclosed, including replacement of a reactor's entire content of catalyst where the reactor is operated as a fixed bed. While this approach is relatively simple from an engineering standpoint, it may not be as efficient as a "moving bed" approach. In this approach, the catalyst is continuously replaced, by withdrawal of portions of catalyst, either co-current with the direction of reactant feed (see, eg, U.S. Pat. Nos. 3,849,295 to Addison (removal of catalyst from moving bed reactor systems) and 3,785,963 to Boyd et al (withdrawing uniform amounts of solids from a movable bed)), or countercurrent to reactant feed (see, eg, U.S. Pat. No. 3,910,834 (where counterflow of catalyst also filters out solids in the feed). Other related approaches have used fluidized or ebullating beds (see, eg, U.S. Pat. No. 4,217,206 to Nongbri).

Some of the continuous or intermittent replacement systems such as those of the previous paragraph can be operated in fluidized mode while others employ dense phase transport. In a dilute phase or fluidized transport, the solid is in a suspension wherein the properties of the suspension resemble those of a fluid. In a dense phase mode, however, the suspended particles are carried along by the viscous drag of the moving fluid and they are thus not suspended in the fluid in the technical sense. In traditional dilute phase transport, eg, the manner customarily used for transporting grain, 85 to 95% of the suspension is the carrying fluid if the fluid is a gas; about 60–80% is fluid, if liquid is the carrier. In a dense phase mode, about 10 to 50 times less gas or liquid is present as carrying fluid.

Experience in the field of gas/solid transport (as opposed to liquid/solid transport) has shown that the flow of solids in such systems can be controlled by an L-valve. L-valves have not been commonly used in liquid/solid transport. Briefly, an L-valve is a 90° bend in the pathway traversed by the suspension of solids having a vertical and horizontal component. The suspension moves by falling through the vertical component. The horizontal component is of sufficient length relative to the amount of free vertical space above it that, absent the behavior of the suspension as a fluid, the solids dropped through the vertical component would come to rest in a pile corresponding to the angle of repose for the particles. The "valve" will not permit the flow of solid particles past it unless there is sufficient gas pressure behind the direction of flow to dislodge the solid particles from thus resting at their angle of repose. Simply put, the valve is closed to solid flow as long as circulation of gas is terminated; the valve is open to the passage of solids when the flow of gas continues to suspend the particles.

The use of such valves in gas/solid systems has been disclosed in U.S. Pat. No. 4,202,673 relating to coal gasification systems. In this case, the gas flow behind the L-valve is directly regulated in order to control solid transfer. U.S. Pat. No. 2,723,883 discloses another approach to controlling the flow of solids through a 90° angle by offsetting the pressure exerted by a column of solid, thus permitting the height of the column to regulate the discharge of solid through the offset.

The present invention utilizes the L-valve in liquid/solid systems, offers a novel means whereby both solid/liquid systems and solid/gas systems can be used to transport solid particles, whereby both dense phase and fluidized systems are usable in solid transfer, and whereby the control of the solids transport can be achieved without use of mechanical valves in contact with the solid particles, using the fluid of the system itself as a means of control. Thus, the problems of poor control and mechanical wear on the valves are obviated. This is not the case with the presently used systems for controlling solid flow in gases or liquids, such as lock hoppers (which are scored frequently when opened and closed), double valving systems, and let down valves (which are destroyed by high velocity solids).

SUMMARY OF THE INVENTION

The invention provides a means for circulating solid/fluid slurries, starting and stopping the flow of solids, recovering the solids from the circulating slurry, if desired, and resupplying solid/fluid slurry to the system, all without contact between mechanical valving and either solids or solid/fluid slurry.

This is achieved by providing, in the circulating conduit system, at least one L-valve past which the slurry must flow. Subsequent to passage through the L-valve, the slurry is conducted to a settler which permits removal of at least a portion of the fluid forming the slurry. In that portion of the system where a portion of the fluid is flowing absent the solids in the slurry, ordinary valve systems or back pressure can readily be used to stop the flow of fluid. This termination of fluid flow has the effect of placing the L-valve in the off position, and the flow of solids is also stopped. Since the L-valve is simply a configuration and has no moving parts, it is not affected by mechanical wear and tear. Performance of the L-valve is not diminished by the presence of a particulate slurry, unlike mechanical valves; indeed its performance depends on the presence of these solids.

Thus, in one aspect, the invention relates to a method of controlling the transport of solids mixed with fluid where the method comprises flowing the slurry past an L-valve and then past a separator which permits the fluid, at least in part, to be conducted to a portion of the system where its flow can be controlled. Control of the separated fluid then permits control of the flow of solids through the L-valve. More briefly, the method of the invention comprises circulating a slurry of solids through an L-valve, separating a portion of the fluid from the solids and controlling the flow of the separated fluid.

In other aspects, the invention relates to an apparatus for carrying out the method of the invention, to a novel radial L-valve configuration, and to the use of L-valves in liquid/solid systems.

BRIEF DESCRIPTION OF THE DRAWINGS

FIG. 1 shows the inclusion of the L-valve using fluid separation to provide controlling means.

FIG. 2 shows two common L-valve configurations.

FIG. 3 shows use of an L-valve in removing solids to a collecting tank.

FIGS. 4A & 4B show configurations which permit introduction of fresh solid and removal of spent solid from a vessel.

FIG. 5 is a side view of a novel radial L-valve.

FIG. 6 is a top view of the valve of FIG. 5.

DETAILED DESCRIPTION

A. Definitions

As used herein, "L-valve" refers to a configuration in a conduit path. Typically, the conduit is used to conduct a slurry of solid particles in a fluid suspending medium. The L-valve consists of a 90° deviation in the pathway of the particles and slurry from a vertical path to a horizontal offset wherein the horizontal offset of the path is of sufficient length relative to its (the offset's) vertical dimension that were the particles not either in suspension or subjected to transporting fluid pressure they would accumulate in a pile at the offset corresponding to their angle of repose.

"Radial L-valve" refers to a novel particular embodiment of the L-valve concept. In this embodiment, the flow of solid or slurry is directed downward vertically against the surface of a barrier, for example, a flat plate or a cone whose apex is opposite the direction of the flow. The surface provides shelter for the horizontal surfaces beneath this "roof". If the surface is itself not flat, it is desirable, in terms of assuring optimum flow characteristics, to provide a flat plate directly beneath the "roof" to guide the slurry flow. Under the barrier, for example, under the apex of the cone, is an opening which permits the passage of solids or slurries through another vertical path. The horizontal distance from the circumference of the barrier to the opening under it is sufficient, compared to the height of the barrier from the surface directly beneath it, to permit the angle of repose for the particles to be achieved before the solid spills over into the opening. A more detailed description of this embodiment is set forth below.

"Angle of repose" is used in its conventional sense, and refers to the angle with the horizontal formed by the pile of particulate solids at equilibrium. Thus, to operate properly, an L-valve must have dimensions such that for each path traversed by the particles the height of the horizontal conduit portion divided by the tangent of the angle of repose of the transported solids is less than the distance the solids must travel to reach an outlet at the other end of the horizontal path. For example, for the path shown in FIG. 2B, $\tan R = a/b$; the horizontal component, c, must be $>b$ and therefore $>a/\tan R$.

"Slurry" refers to, in the context of this invention, a mixture of fluid (gas or liquid) and solid wherein the solid fails to dissolve. Thus, the term "slurry" refers both to such mixtures under dilute phase transport conditions and also under dense phase transport conditions. In dense phase, the voidage is not substantially greater than in the packed state, and the weight of particles is not supported by the fluid. Movement of the partices is due to the viscous drag of the fluid. In dilute phase transport, conventionally often referred to as a suspension, the weight of particles is supported by the fluid and the void volume (ie, the portion of the volume occupied by the fluid) is very large. Movement of the particles is thus aided by their own momentum as they are supported by the fluid, and their apparent weight is thus reduced.

Of course, dense phase and dilute phase transport as above defined represent two ends of a continuum, and intermediate states are often encountered. The "slurries" to which the method and apparatus of the invention may be applied are of all these types. In a particular application, it is possible, and even likely that a portion of the slurried material will obey the characteristics of dense phase transport while another portion exhibits dilute phase transport properties.

"Fluid pressure" refers to the force supplied by the fluid portion of the slurry to the solid particles to effect motion of said particles. As discussed above, the nature of this force may vary with the nature of the slurry, but in general this can be defined as a pressure differential in the fluid such that if, in the diagram "A→B", the pressure of the fluid at A is higher than at B, "fluid pressure" encourages the flow of slurried particles from A to B. In the application herein, however, "fluid pressure" and "fluid flow" are often used interchangeably, ie, the fluid exerts pressure by virtue of its flow, and vice versa.

"Settler" refers to a portion of a circulating system which permits the separation of solid and fluid portions at least in sufficient amount so that some of the fluid can be drawn off free from any substantial solid content.

B. General Description

A system employing the elements of the invention can be designed in a variety of configurations. The essential elements are shown in FIG. 1. As shown in FIG. 1, a vessel 10 containing the fluid/solid slurry is connected through an L-valve 14 through a settling vessel 15 to a fluid conduit system. The settler 15 permits a portion of the separated fluid to be drawn through the conduit 16 free of solids, and regulation of the system through regulation of fluid flow.

One means of regulation comprises providing a flow pressure, symbolized by the pump 12. The flow pump provides driving force which causes the flow of the slurry through the system as long as it is applied. When it is decided to stop the flow of solids in the system, the flow pressure is stopped and, if desired, the valve 18 is closed. There is now no circulating fluid or fluid transport pressure, so the the L-valve is closed to the passage of solids. As there is no further flow of solid through the L-valve, there is no further flow of solid to the settler, and it can be removed, if desired, in order to empty it of solids, for example.

(It is by no means necessary that an external source, such as the pump at 12 be the provider of this flow pressure; the flow pressure could be due also to a higher pressure in vessel 10 than that downstream of valve 18.)

One particular configuration which is effective takes advantage of a gas phase formed over a liquid-based slurry which comprises part of the separation in settler vessel 15. By regulating the pressure of the gas phase, the pressure differential between the reactant vessel 10 and the settler 15 can be conveniently regulated. Thus, by metering the gas phase or by applying reverse gas pressure against it, the flow of fluid, and thereby the flow of solids, can be stopped and started. Clearly, such regulation of gas pressure is independent of contact with the solids traveling through the system.

The general design of several common embodiments of L-valves is shown in FIG. 2. In FIG. 2A the valve is simply a 90° bend in a vertical pipe such that the angle formed by the cumulated solids 20 does not permit the pile of solids to extend beyond the point 22 where further vertical flow could take place. A slight modification of this valve is shown in FIG. 2B as a horizontal takeoff from, for example, a reactor tank. Again, the horizontal surface of the valve extends past the bottom of the pile 24 whose volume and horizontal dimension is limited by the angle of repose and the solids fall short of the bend 26. A particularly preferred alternate embodiment of an L-valve, which can be used in either gas/solid or liquid/solid systems, and which is novel, is discussed in connection with FIGS. 5 and 6 below.

While the basic elements of the system are described in FIGS. 1 and 2, it is helpful in understanding the features and advantages of the invention to view it as applied in particular and novel configurations. FIG. 3 shows an embodiment of a system for solid removal from a vessel so that means for removal of solid from the entire system are illustrated and a return of fluid to the vessel is provided. As shown in FIG. 3, the solid is removed from the vessel 30 through an L-valve 32 in a direction co-current or countercurrent to, for example, a reactant feed. As previously described, the L-valve 32 is opened or closed to solids by virtue of control through, for example, a recirculating pump 34 which in this illustration provides the flow pressure through the slurry circulating system, and supplementary regulation at valve 36, which further controls fluid flow through that system. During operation, the valve 38 between the settler and the collecting tank 33 is open. When the L-valve has closed off the flow of solids, and all of the solids from the settler have accumulated in the collecting tank, the valve 38, free from particulate matter can be closed. The collecting tank can then be removed and the solid, eg, catalyst or ion exchange resin is regenerated independently of the system, if desired. Fresh or regenerated material is then returned to the reactor 30, the collecting tank is reconnected, the valve 38 reopened absent the presence of solid particles, and the recirculation of the slurry started by opening the valve 6 and restarting the pump 34.

In some applications, it is desired to replace, for example, spent catalyst, or used ion exchange resin with fresh material on a continuous or controlled intermittent basis. In such systems, not only are catalysts or resins withdrawn during operation, they are also added back to the reactor, and provision for such addition must be made. A slightly more complex double L-valve system is shown in FIGS. 4A and 4B. These systems include a branch for the addition of fresh solid from a feeding tank 40 which is fed from a reservoir 43, and wherein flow into the reaction vessel is controlled by additional L-valve 42. Such control is desirable as the solids to be added also make mechanical valve systems unsuitable. In FIG. 4A the addition system is controlled by, for example, an independent pump 44 which in this illustration provides fluid flow pressure to insure that L-valve 42 is open for admission of the suspension; by shutting off the pump (and closing valve 45, if desired), the fluid flow pressure is removed, thus closing L-valve 42. The exit line 47 must, of course, be above the level of solids in the vessel 30, and it thus carries only fluid through the valve 45. Additional solid can be admitted to the feeding tank 40 from removable reservoir 43 when valve 49 is open. Valve 49 is closed when addition is complete. The remaining portions of the system, with respect to catalyst or other solid removal from the vessel, are as were described in regard to FIG. 3.

FIG. 4B shows a similar system wherein the addition and removal systems are interconnected through the same pump 46. This system offers some advantage of synchrony between the addition and removal but, of course, does not permit independent control. The remaining features of this system have been described. The slurry circulates thrugh the L-valve 32 when the pump 46 creates a fluid flow pressure. Fluid is removed by permitting the slurry to settle in the settler 37 and the fluid circulated through the pump and into the feeding tank 40. Due to the fluid flow pressure, the slurry also is permitted past L-valve 42 and into the vessel 30. When fluid flow pressure is removed by shutting down pump 46, the L-valves 32 and 42 are closed to solids, and collection tank 33 can be removed from the system. While in the foregoing illustrations a pump has been used to supply the fluid flow pressure, other means, such as vacuum outlets or regulation of gas flow, as explained above, could also be used.

As explained above, the embodiments in FIGS. 3 and 4 show a reactor feed as optionally co-current or countercurrent to the solid particle circulation. For those constructions where the feed is co-current, a filter or screen or other solids flow impeder may be required at the feed exit to prevent loss of such solid particles through the exit line.

FIGS. 5 and 6, respectively, are a side view and top view of a radial L-valve configuration. This configuration is particularly preferred and represents a novel embodiment of the L-valve concept, whether used for gas or liquid slurries.

The radial valve is placed in the path of the vertical flow of the slurry. Thus, the horizontal traverse of the slurry covers a 360° angle, and the paths of material converge at a "central" outlet to an additional vertical path component. Because of the effective multiplicity of paths, such an embodiment is less likely to clog, and will tolerate flows in the dense phase type of operation more easily than the conventional gas/solid L-valves known in the art. The valve is constructed by providing a radial set of sheltered horizontal paths which converge on an opening or port to a subsequent vertical drop. Referring to FIG. 5, the slurry or solids, which traverse the vertical paths 51, encounter the sheltering means 52. The sheltering means here shown is a conical "roof"; however, other types of barriers are, of course, possible. For example a, flat disc could be substituted for the cone. While a circular projection onto the horizontal is depicted, barriers which result in irregularly shaped projections could, of course, also be used, as long as all potential slurry paths meet L-valve characteristics. The vertical cross section of the barrier can also vary in shape. However, the cone shown or a flat circular barrier are easiest to construct. If other than a flat barrier is used, it is desirable, to improve the flow characteristics, to provide a horizontal shield at the level of the lower edge of the "roof" so that solids are not carried to a high level within the cavity between the barrier and the horizontal surface and dead space is not present.

In the presence of carrier fluid flow, the solids are swept under the shelter and into the orifice 53, where they proceed to a settler 54. The flat surface 66 prevents eddy currents and/or the formation of dead space. Fluid is removed from the top of the settler at 55 and recirculated, using the pump at 56, to the top of reactor 57, where the continued liquid or gas flow creates a positive pressure to keep the L-valve open. When the pump 56 is turned off and the liquid or gas no longer flows, the solids encountering the shelter 52 fall to their angle of repose 58, which is such that the solids never reach the orifice 53, and L-valve is closed. This permits the ancillary valve 59 to be closed in the absence of solids, and the settler 54 can be disconnected from the system.

The top view of the same embodiment shown in FIG. 6 dramatizes the multiplicity of flow paths available to the slurry. The slurry converges to the orifice 53 over 360° of arc. A fraction of this arc, if impeded through accidental clumping, etc., leaves the remaining degrees of arc open and thus still permits the system to function. Accordingly, the valve is resistant to incidental or random events which might cause total blockage in conventional L-valves. The deflector in this illustration is held in place by four support rods 61 which collectively occupy very small segments of arc angle. Flow rate can also be controlled to some extent, if desired, by deliberate partial pathway blockage.

The operation as described is as for L-valves in general. Referring to FIG. 6, the distance 62 from the edge of the deflector to the orifice is sufficiently long compared to the height of the deflector 63 (see FIG. 5) so that when the flow of fluid is stopped, the solid accumulation 64 at its angle of repose 58 fails to access the orifice 53, and the movement of solid is thereby stopped. Stated another way, at each potential pathway (ie, each angle of arc) the distance 62 is greater than the quantity defined by the tangent of angle 58 divided by the distance 62.

Thus, in this embodiment and in all other radial embodiments, the condition which must be met is that at every degree of arc, the distance of the perimeter of the barrier to the horizontal surface, ie, its height, divided by the tangent of the angle of repose of the particles must be less than the horizontal distance from a point on the horizontal surface directly below the edge of the barrier to the edge of the outlet. Only fluid flow (viscous drag, if dense phase transport, suspension carrige, if dilute phase transport) permits solid to be carried along the horizontal path 62 and through the orifice.

I claim:

1. A method for controlling the transport of solids slurried in a liquid, which method comprises:
    (a) passing the slurried solids through an L-valve;
    (b) separating a portion of the liquid from the slurry exiting the L-valve; and
    (c) controlling the flow of the separated liquid.

2. A method for controlling the transport of solids in a liquid containing system which method comprises:
    (a) maintaining in at least a portion of the system a slurry of said solids in a liquid;
    (b) passing the slurry through an L-valve;
    (c) separating a portion of the liquid from the slurry exiting the L-valve; and
    (d) controlling the liquid pressure across the L-valve by controlling the flow of separated liquid.

3. An apparatus for controlling the transport of solids slurried in a liquid which apparatus comprises:
    (a) an L-valve;
    (b) a means for separating at least a portion of the liquid from the slurry exiting the L-valve; and
    (c) a means for controlling liquid pressure through said L-valve by controlling the flow of the separated liquid.

4. An apparatus for controlling the transport of solids which apparatus comprises:
    (a) a first conduit for passage of a slurry of the solids in a liquid through an L-valve;
    (b) a separator for removing some of the liquid from the slurry downstream from the L-valve; and
    (c) a second conduit for transport of the removed liquid, having therein a means for controlling the flow of the separated liquid.

5. An apparatus for controlling the flow of solids slurried in a liquid, which apparatus comprises:
    (a) an L-valve, and, downstream therefrom,
    (b) a means for separating the solids from at least some of the liquid;
    (c) a means for controlling the flow of the separated liquid.

6. An apparatus for controlling the flow of solid particles which are slurried with a liquid, which apparatus comprises:
    (a) an L-valve; and
    (b) a means for controlling liquid pressure on said solid particles in the L-valve.

7. An apparatus for controlling the flow of solid particles which are slurried with a liquid, which apparatus comprises:
    (a) a radial L-valve consisting essentially of a circular barrier and an outlet in a horizontal surface below the barrier wherein
        (i) the barrier is in the shape of a cone having an apex upstream of the outlet and directed against the direction of flow, and the barrier is positioned to interfere with the flow of a liquid slurry of solids through the outlet; and
        (ii) the horizontal distance from the perimeter of the barrier to the edge of the outlet at each degree of arc is greater than the quantity defined by the vertical distance between the perimeter of the barrier and the horizontal surface at said degree of arc, divided by the tangent of the angle of repose of the solids; and
    (b) a means for controlling liquid pressure on said solid particles in the L-valve.

* * * * *

UNITED STATES PATENT AND TRADEMARK OFFICE
CERTIFICATE OF CORRECTION

PATENT NO. : 4,687,382
DATED : August 18, 1987
INVENTOR(S) : DAVID S. SMITH

It is certified that error appears in the above-identified patent and that said Letters Patent are hereby corrected as shown below:

Title page, item [73]

ASSIGNEE: "CHEVRON RESEARCH CORPORATION" should read
--CHEVRON RESEARCH COMPANY--

Signed and Sealed this

Third Day of May, 1988

Attest:

DONALD J. QUIGG

Attesting Officer

Commissioner of Patents and Trademarks